United States Patent
Michl et al.

(10) Patent No.: US 7,084,224 B2
(45) Date of Patent: Aug. 1, 2006

(54) USE OF $C_4$-$C_6$-POLYMERCAPTOPOLYOLS AS REGULATORS IN SOLUTION OR PRECIPITATION POLYMERIZATION

(75) Inventors: Kathrin Michl, Ludwigshafen (DE); Tilman L. Taeger, Seeheim-Jugenheim (DE); Gunther Pabst, Neumark i. d. OPf. (DE); Philippe Lamalle, Lambsheim (DE); Stephan Hueffer, Ludwigshafen (DE); Stefan Schroeder, Neuleiningen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/887,833

(22) Filed: Jul. 12, 2004

(65) Prior Publication Data

US 2005/0020790 A1    Jan. 27, 2005

(30) Foreign Application Priority Data

Jul. 22, 2003    (DE)    ................. 103 33 319

(51) Int. Cl.
*C08F 2/38*    (2006.01)
(52) U.S. Cl. .................. 526/210; 526/227; 526/217; 526/317.1
(58) Field of Classification Search ................. 526/210, 526/227, 217, 317.1
See application file for complete search history.

(56) References Cited

U.S. PATENT DOCUMENTS

| 4,472,569 A | 9/1984 | Gray et al. | |
| 6,258,896 B1* | 7/2001 | Abuelyaman et al. | ...... 525/437 |
| 6,262,207 B1* | 7/2001 | Rao et al. | ................... 526/224 |

FOREIGN PATENT DOCUMENTS

JP    61-255353    11/1986

OTHER PUBLICATIONS

Derwent Publications Ltd., AN 1986-342264, XP002316168.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

The present invention relates to $C_4$–$C_6$-polymercaptopolyols as regulators in the free-radically initiated solution and precipitation polymerization of ethylenically unsaturated monomers.

11 Claims, No Drawings

USE OF $C_4$-$C_6$-POLYMERCAPTOPOLYOLS AS REGULATORS IN SOLUTION OR PRECIPITATION POLYMERIZATION

The present invention relates to $C_4$–$C_6$-polymercaptopolyols as regulators in the free-radically initiated solution and precipitation polymerization of ethylenically unsaturated monomers.

During the free-radical polymerization of ethylenically unsaturated monomers, regulators are often used to control the molecular weight. These are substances which transfer a free radical to the free-radical end of the growing polymer chain and themselves initiate a new polymerization. This limits the degree of polymerization of the macromolecules formed.

In the aqueous solution polymerization of ethylenically unsaturated monomers, i.e. in the polymerization of ethylenically unsaturated monomers in an aqueous solution in homogeneous phase, water-soluble mercapto compounds, such as thioethanol, have occasionally been used. A disadvantage is the strong and highly unpleasant odor of the aqueous polymer solutions obtained in this way.

JP 61255353 describes the suspension polymerization of unsaturated monomers in the presence of 1,4-dimercaptobutane-2,3-diol. The mercaptan reportedly prevents an emulsion polymerization taking place in the aqueous phase as competing reaction alongside the suspension polymerization.

It is an object of the present invention to provide a regulator for the solution and precipitation polymerization of ethylenically unsaturated monomers which is essentially odor-neutral and at the same time has good regulating characteristics. We have found that this object is achieved by $C_4$–$C_6$-polymercaptopolyols.

The present invention therefore provides for a process for polymerization of ethylenically unsaturated monomers in an aqueous solvent by a free-radically initiated solution or precipitation polymerization technique in the presence of a chain regulator which is selected from the group of $C_4$–$C_6$-polymercaptopolyols.

For the purposes of the present invention, solution polymerization is understood as meaning the polymerization of ethylenically unsaturated monomers in an aqueous solvent, where both the monomers used and also the polymers formed during the polymerization are soluble in the aqueous solvent. Precipitation polymerization is understood, by contrast, as meaning the polymerization of ethylenically unsaturated monomers in an aqueous solvent, while the monomers used are soluble in the aqueous solvent, but the polymers formed during the polymerization are not and precipitate in the course of their formation.

For the purposes of the present invention, $C_4$–$C_6$-polymercaptopolyols are understood as meaning aliphatic compounds having 4 to 6 carbon atoms and having at least two OH groups and at least two SH groups. Here, each carbon atom usually carries at most one OH or SH group.

The $C_4$–$C_6$-polymercaptopolyols are preferably compounds of the formula I

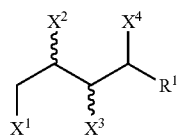

(I)

in which
$R^1$ is H or $C_1$–$C_2$-alkyl, which may be substituted by one or two SH or OH groups, and
$X^1$, $X^2$, $X^3$ and $X^4$ are H, SH, OH or $C_1$–$C_2$-alkyl, which may be substituted by one or two SH or OH groups, with the proviso that the compounds of the formula I contain 4 to 6 carbon atoms, at least two SH groups and at least two OH groups, where each carbon atom carries at most one OH or SH group.

According to the invention, all positional isomers and stereoisomers (diastereomers and enantiomers) of compound I, and mixtures thereof, are suitable.

$C_1$–$C_2$-Alkyl, which may be substituted by one or two SH or OH groups, is, for example, methyl, ethyl, hydroxymethyl, 1- or 2-hydroxyethyl, 1,2-dihydroxyethyl, mercaptomethyl, 1- or 2-mercaptoethyl or 1,2-dimercaptoethyl.

Preference is given to using a dimercaptobutanediol, i.e. a compound of the formula I in which $R^1$ is H and two of the groups X are SH and two of the groups X are OH.

The compound of the formula I is particularly preferably 1,4-dimercaptobutane-2,3-diol.

For the purposes of the present invention, the term "1,4-dimercaptobutane-2,3-diol" covers all stereoisomers, i.e. both the erythro form (meso form; also referred to as dithioerythrol), and also the enantiomer pair (R,R and S,S enantiomer) of the threo form (also referred to as dithiothreitol), and mixtures of these conformers.

1,4-Dimercaptobutane-2,3-diol is a known, commercially available compound. Compounds of the formula I other than this are obtainable by known processes of the prior art, for example according to the process described in U.S. Pat. No. 4,472,569 or by analogous reactions.

The regulator is preferably used in an amount of from 0.01 to 25% by weight, particularly preferably from 0.1 to 20% by weight and in particular from 0.5 to 15% by weight, based on the total amount of the monomers to be polymerized.

For the purposes of the present invention, the term "essentially odor-neutral" is understood as meaning that the polymer formed during the solution or precipitation polymerization has no unpleasant, thiol-like odor for a person with an average sense of smell.

According to the invention, the solution or precipitation polymerization is carried out in an aqueous solvent. The aqueous solvent is preferably water or a mixture of water and at least one organic solvent which is essentially completely miscible with water.

"Organic solvent essentially completely miscible with water" is understood as meaning those solvents which are miscible with water in an amount of at least 50% by weight, preferably in an amount of at least 70% by weight and in particular in any weight ratio. These include $C_1$–$C_4$-alcohols, such as methanol, ethanol, propanol, isopropanol, n-butanol, sec-butanol, isobutanol and tert-butanol, ketones with three or four carbon atoms, such as acetone or methyl ethyl ketone, $C_2$–$C_4$-alkanediols and $C_2$–$C_4$-alkanetriols, such as ethylene glycol, propylene glycol or glycerol, and cyclic ethers with four carbon atoms and one or two ring oxygen atoms, such as tetrahydrofuran and dioxane. The organic solvents which are essentially miscible with water are preferably $C_1$–$C_3$-alcohols. Suitable mixtures comprise, for example, 5 to 80% by weight, preferably 5 to 50% by weight, of the organic solvent.

The aqueous solvent preferably comprises at least 50% by weight of water. The aqueous solvent used is particularly preferably water, which comprises at most 30% by weight, preferably at most 10% by weight and in particular at most 5% by weight, of an organic solvent which is essentially miscible with water. In particular, water is used as the sole reaction medium.

The pH of the reaction medium can in principle be varied over a wide range. As a rule, the pH is chosen according to the monomer to be polymerized and can be determined in individual cases by the person skilled in the art. However, the polymerization is often carried out at a pH in the range from 2 to 10, preferably in the range from 4 to 9. In this connection, the pH can be adjusted or maintained by adding a base, such as ammonia or sodium hydroxide, or an acid, such as hydrochloric acid or sulfuric acid. Alternatively, the polymerization can be carried out in the presence of a suitable buffer, for example ammonium hydrogencarbonate, hydrogenphosphate, borate, acetate, citrate, succinate, glycinate or phthalate.

For the free-radical initiation of the polymerization reaction, as is customary for solution or precipitation polymerizations, use is usually made of initiators, i.e. substances which decompose to form free radicals and thus trigger the free-radical polymerization of the ethylenically unsaturated monomers. Their solubility in water is advantageously so good that the amount of initiator used is in completely dissolved form within the reaction medium. Preference is given to using initiators which are also thermally activatable, i.e. those compounds which decompose into free radicals upon heating at about 40 to 150° C. Preferred polymerization initiators include water-soluble azocompounds, such as 2,2'-azobis[2-(2-imidazolin-2-yl)propane], 2,2'-azobis(2-amidinopropane), 2,2'-azobis(2-methylpropionamidine) and acid addition salts thereof, in particular their hydrochlorides, acetates or (hydrogen)sulfates, 4,4'-azobis (4-cyanovaleric acid) and alkali metal or ammonium salts thereof, in particular their sodium salts, 2-(carbamoylazo) isobutyronitrile; in addition water-soluble peroxide and hydrogenperoxide, such as tert-butyl hydroperoxide, tert-amyl hydroperoxide, cumene hydroperoxide, pinane hydroperoxide, peroxodisulfuric acid and its salts, in particular its alkali metal or ammonium salts, e.g. the sodium salt (sodium persulfate), and also hydrogen peroxide and percarbonates. Also suitable are mixtures of the abovementioned initiators.

Said peroxides and hydrogenperoxides may be used on their own or preferably with a reducing agent, e.g. a salt of hydroxymethanesulfinic acid or ascorbic acid, a (hydrogen) sulfite or a thiosulfate and/or a transition metal compound whose transition metal may be present in aqueous solution in different oxidation states, for example iron(II), cobalt(II), nickel(II), manganese(II), vanadium(II), silver(I), titanium (III) or copper (I) salts, in particular the chlorides, sulfates or acetates (so-called redox initiator systems). Preferably, the reducing component here is used in molar deficit, based on the (hydrogen)peroxides. (Hydrogen)sulfites as reducing agents are, however, also often used in molar excess.

Particularly preferred initiators are the salts of peroxodisulfuric acid, in particular sodium persulfate, and hydrogen peroxide, it also being possible to use these initiators together with the abovementioned transition metal salts. A particularly preferred initiator is also 2,2'-azobis(2-methylpropionamidine)hydrochloride.

The initiator is preferably used in an amount of from 0.05 to 15% by weight, particularly preferably from 0.5 to 7% by weight and in particular from 0.5 to 4% by weight, based on the total amount of the monomers to be polymerized.

Suitable ethylenically unsaturated monomers are, in principle, all those ethylenically unsaturated monomers which are customarily used in a free-radically initiated aqueous solution or precipitation polymerization. These are generally monoethylenically unsaturated water-soluble monomers. For the purposes of the present invention, water-soluble monomers are understood as meaning those with a solubility in water of >80 g/l at 25° C.

Also suitable, however, are mixtures of monoethylenically unsaturated water-soluble monomers with monoethylenically unsaturated monomers which have limited solubility in water and/or are hydrophobic. Monomers with limited solubility in water is understood for the purposes of the present invention as meaning monomers with a solubility in water of from 10 to 80 g/l at 25° C. Hydrophobic monomers are understood as meaning those with a solubility in water of <10 g/l at 25° C. The monomers to be polymerized can also comprise small amounts of di- or polyethylenically unsaturated monomers. Preferably, the monomers to be polymerized comprise at most 10% by weight, particularly preferably at most 5% by weight and in particular at most 1% by weight, based on the total weight of the monoethylenically unsaturated monomers, of di- or polyethylenically unsaturated monomers.

In a preferred embodiment, the ethylenically unsaturated monomers comprise
A) 45 to 100% by weight of monoethylenically unsaturated monomers with a solubility in water of >80 g/l at 25° C.;
B) 0 to 55% by weight of monoethylenically unsaturated monomers with a solubility in water of from 10 to 80 g/l at 25° C. and
C) 0 to 5% by weight of monoethylenically unsaturated monomers with a solubility in water of <10 g/l at 25° C., where the percentage by weight data referred to the total weight of the monomers used.

A) Water-Soluble Monomers:

Suitable water-soluble monomers A) are chosen, for example, from the following classes of substance:

1) Aliphatic α,β-unsaturated $C_3$–$C_8$-monocarboxylic acids and certain derivatives thereof:

Suitable aliphatic α,β-unsaturated $C_3$–$C_8$-monocarboxylic acids are, for example, acrylic acid, methacrylic acid, crotonic acid, isocrotonic acid, ethylacrylic acid, dimethylacrylic acid, allylacetic acid and vinylacetic acid.

Suitable carboxylic acid derivatives are, for example, the salts of the aliphatic α,β-unsaturated $C_3$–$C_8$-monocarboxylic acids. Suitable salts of the abovementioned carboxylic acids include alkali metal and alkaline earth metal salts, e.g. the sodium, potassium, magnesium or calcium salts, and also the ammonium salts. Suitable ammonium salts are either the salts of the ammonium cation $NH_4^+$ itself, or mono-, di-, tri- or tetraalkyl or -hydroxyalkyl-substituted ammonium cations, for example mono-, di-, tri- or tetramethylammonium, tetrabutylammonium, diethanolammonium, triethanolammonium and the like. The salts are obtainable, for example, by converting the free acids into the anionic form prior to the polymerization using a suitable base, preferably in the form of an aqueous or aqueous-alcoholic solution. Suitable bases include the hydroxides and carbonates of the abovementioned alkali metals, calcium hydroxide, ammonia and organic amines, pyridines and amidines. Suitable organic amines include, in particular, mono-, di- or trialkanolamines having 2 to 5 carbon atoms in the alkanol radical, such as mono-, di- or triethanolamine, mono-, di- or tri(iso)propanolamine or 2-amino-2-methyl-propanol; alkanediolamines having 2 to 4 carbon atoms in the alkanediol radical, such as 2-amino-2-methyl-1,3-propanediol or 2-amino-2-ethyl-1,3-propanediol; alkanepolyolamines and aminoethers, such as morpholine.

Further suitable derivatives are the esters of the aliphatic α,β-unsaturated $C_3$–$C_8$-monocarboxylic acids with $C_2$–$C_3$-diols. Examples of suitable esters are hydroxy(meth)acrylates, such as 2-hydroxyethyl(meth)acrylate and 2- and 3-hydroxypropyl(meth)acrylate.

Suitable derivatives also include the esters of the aliphatic α,β-unsaturated $C_3$–$C_8$-monocarboxylic acids with polyetherpolyols. Suitable polyetherpolyols are those of the formula HO–[AO–]$_n$–A–OH, in which A is ethylene or propylene and n is a number from 1 to 100. Suitable esters are, for example, the (meth)acrylic esters of polyethylene glycol or polypropylene glycol, and the (meth)acrylic esters of polyethylene glycol/polypropylene glycol block copolyethers.

Suitable derivatives are also the esters of aliphatic α,β-unsaturated $C_3$–$C_8$-monocarboxylic acids with $C_2$–$C_3$-aminoalcohols. Suitable aminoalcohols are, for example, 2-aminoethanol and 3-aminopropanol. The aminofunction may also be present in quaternized form.

Further suitable derivatives are the amides of the aliphatic α,β-unsaturated $C_3$–$C_8$-monocarboxylic acids. Suitable amides are those which are obtainable by reacting the carboxylic acid or suitable derivatives thereof with ammonia or mono- or di-$C_1$–$C_2$-alkylamines, such as methyl, ethyl, dimethyl- or diethylamine.

Suitable derivatives also include the amides of the aliphatic α,β-unsaturated $C_3$–$C_8$-monocarboxylic acids with diamines(aminoamides). Suitable aminoamides are obtainable, for example, by reacting the carboxylic acid or a suitable derivative thereof with a $C_2$–$C_3$-diaminoalkane. Examples of suitable diaminoalkanes are ethylenediamine, 1,3-propylenediamine, N-methylethylenediamine, N,N-dimethylethylenediamine, N-methylpropylenediamine and N,N-dimethylpropylenediamine. The aminofunction present in the aminoamides may also be present in quaternized form.

Finally, suitable derivatives also include the N-methylolamides of the aliphatic α,β-unsaturated $C_3$–$C_8$-monocarboxylic acids with methylolamine, e.g. N-methylol(meth)acrylamide.

2) Suitable water-soluble monomers A) further include aliphatic α,β-unsaturated $C_4$–$C_8$-dicarboxylic acids and suitable derivatives thereof.

Suitable aliphatic α,β-unsaturated $C_4$–$C_8$-dicarboxylic acids include maleic acid, fumaric acid, itaconic acid, citraconic acid and mesaconic acid.

Suitable dicarboxylic acid derivatives are, for example, the anhydrides of the abovementioned dicarboxylic acids, e.g. maleic anhydride or citraconic anhydride.

Suitable derivatives are also the salts of aliphatic α,β-unsaturated $C_4$–$C_8$-dicarboxylic acids. Both the mono- and also the di-salts of the abovementioned dicarboxylic acids with the abovementioned countercations are suitable.

In addition, suitable derivatives include the mono-$C_1$–$C_2$-alkyl esters of aliphatic α,β-unsaturated $C_4$–$C_8$-dicarboxylic acids. Suitable examples thereof are monomethyl maleate, monomethyl fumarate and monomethyl itaconate. The nonesterified carboxyl group can also be in the form of the carboxylate anion.

Suitable derivatives also include the mono- and diamides of aliphatic α,β-unsaturated $C_4$–$C_8$-dicarboxylic acids. Suitable amides are those which are obtainable by the reaction of the dicarboxylic acid or of a suitable derivative thereof with ammonia or a mono- or di-$C_1$–$C_2$-dialkylamine, such as methyl-, ethyl-, dimethyl- or diethylamine. In the case of the monoamides, the carboxyl group which does not carry the amide function may also be present in the form of the carboxylate anion.

Further suitable derivatives are the mono- and diesters of aliphatic α,β-unsaturated $C_4$–$C_8$-dicarboxylic acids with polyetherpolyols. Suitable polyetherpolyols are those mentioned above.

Also suitable are the following water-soluble monomers:

3) Ethylenically unsaturated sulfonic acids and salts thereof:

Examples of suitable sulfonic acids are vinylsulfonic acid, styrenesulfonic acid, allylsulfonic acid, methallylsulfonic acid, 2-acrylamido-3-methylpropanesulfonic acid, 2-methylacrylamido-2-methylpropanesulfonic acid, 3-sulfopropyl (meth)acrylate and 2-sulfoethyl(meth)acrylate. Particularly suitable are the alkali metal or ammonium salts, for example the sodium, potassium or ammonium salts of the abovementioned sulfonic acid. The acids can also be used in partially neutralized form.

4) Ethylenically unsaturated phosphonic acids and salts thereof:

Examples of suitable phosphonic acids are vinylphosphonic acid, allylphosphonic acid and acrylamidomethylpropanesulfonic acid and, in particular, alkali metal or ammonium salts thereof, for example the sodium, potassium or ammonium salt. The phosphonic acids can also be used in partially neutralized form.

5) N-Vinylcarboxamides:

Suitable N-vinylcarboxamides are, for example, N-vinylformamide, N-vinylacetamide and N-methyl-N-vinylacetamide.

6) Aromatic and nonaromatic N-vinyl heterocycles:

a) Suitable nonaromatic N-vinyl heterocycles are, for example, N-vinyllactams, such as N-vinylcaprolactam, N-vinylpiperidone and N-vinylpyrrolidone, and N-vinylimidazolines, such as N-vinylimidazoline, 2-, 4- and 5-methyl-1-vinylimidazoline. The vinylimidazolines are, in particular, present in quaternized form.

b) Suitable aromatic N-vinyl heterocycles are, for example, N-vinylimidazoles, such as N-vinylimidazole, 2-, 4- and 5-methyl-1-vinylimidazole and 2-ethyl-1-vinylimidazole, and 2-, 3- and 4-vinylpyridines and, in particular the quaternized derivatives of N-vinylimidazoles and vinylpyridines.

The quaternary derivatives of nitrogen-basic compounds specified for the water-soluble monomers A) are usually obtainable by converting the corresponding nitrogen-basic compounds, e.g. the N-vinylimidazoles, the N-vinylimidazolines, the vinylpyridines, the amidoamines or the aminoalkyl esters of carboxylic acids, into the quaternary form using a suitable alkylating reagent. Suitable alkylating agents include alkyl halides, such as methyl chloride, methyl bromide, methyl iodide, ethyl chloride, propyl chloride, benzyl chloride or benzyl bromide, and also dialkyl sulfates, such as dimethyl sulfate or diethyl sulfate, and also alkylene oxides, such as ethylene oxide or propylene oxide, in the presence of acids. Preferred alkylating agents are methyl chloride, dimethyl sulfate and diethyl sulfate. Quaternized aminoesters or aminoamides are also obtainable by introducing the amino alcohol or the diamine already in quaternized form into the esterification or amide formation reaction.

Preferred water-soluble monomers A) are the abovementioned aliphatic α,β-unsaturated $C_3$–$C_8$-monocarboxylic acids and their derivatives, and also the N-vinylimidazoles. Of these, particular preference is given to acrylic acid, methacrylic acid and N-vinylimidazole. Preferred water-soluble monomers A) are also the abovementioned aliphatic α,β-unsaturated $C_4$–$C_8$-dicarboxylic acids and their anhydrides.

B) Monomers with limited solubility in water:

Suitable monomers B) with limited solubility in water are, for example, (meth)acrylonitrile, (meth)acrylates of $C_1$–$C_2$-alcohols, such as methyl acrylate, methyl methacrylate, ethyl acrylate and ethyl methacrylate, and the vinyl esters of the $C_2$–$C_3$-monocarboxylic acids, such as vinyl acetate and vinyl propionate.

C) Hydrophobic monomers:

Suitable monomers C) are, in principle, all hydrophobic monomers with a solubility in water of <10 g/l at 25° C. which can be copolymerized with the monomers A) and optionally B). In particular, the following are suitable:

1) The esters of the abovementioned aliphatic α,β-unsaturated $C_3$–$C_8$-monocarboxylic acids with $C_3$–$C_{16}$-alkanols or $C_5$–$C_{10}$-cycloalkanols, such as propanol, isopropanol, n-butanol, sec-butanol, isobutanol, tert-butanol, n-pentanol, n-hexanol, 2-ethylhexan-1-ol, n-octanol, n-decanol, cyclohexanol, 4-tert-butylhexanol and 2,3,5-trimethylcyclohexanol.

2) The diesters of the abovementioned aliphatic α,β-unsaturated $C_4$–$C_8$-dicarboxylic acids with the abovementioned $C_3$–$C_{13}$-alkanols or $C_5$–$C_{10}$-cycloalkanols, for example di-n-butyl maleate.

3) Vinyl, allyl and methallyl esters of linear or branched, aliphatic carboxylic acids with 4 to 20 carbon atoms, such as vinyl butyrate, vinyl valerate, vinyl hexanoate, vinyl 2-ethylhexanoate, vinyl decanoate, vinyl laurate and vinyl stearate, and also the corresponding allyl and methallyl esters.

4) Vinylaromatic compounds.

Suitable vinylaromatic compounds are, for example, styrene and α-methylstyrene which may optionally have one or more substituents on the aromatic ring which are chosen from $C_1$–$C_4$-alkyl, halogen atoms, in particular chlorine, and/or hydroxy groups, which may optionally be ethoxylated. Examples thereof are styrene, α-methylstyrene, α-butylstyrene, o-, m-, p-vinyltoluene, 2,4-dimethylstyrene, 3-ethylstyrene, 2,4-diethylstyrene, 2-methoxystyrene, 4-methoxy-3-methylstyrene, 4-acetoxystyrene and vinyl-naphthalene derivatives.

5) Vinyl, allyl and methallyl ethers of linear or branched aliphatic alcohols having 2 to 20 carbon atoms.

Suitable examples here are vinyl methyl ether, vinyl ethyl ether, vinyl dodecyl ether, vinyl hexadecyl ether and vinyl stearyl ether and the corresponding allyl and methallyl ethers.

6) Conjugated dienes.

Suitable examples thereof are conjugated $C_4$–$C_{10}$-dienes, such as butadiene, isoprene and 1-phenylbutadiene.

7) Vinyl chloride and vinylidene chloride.

Preferred hydrophobic monomers are styrene and α-methylstyrene.

Preferably, the monomer mixture used in the solution or precipitation polymerization comprises at least 60% by weight, particularly preferably at least 80% by weight and in particular at least 90% by weight, of monoethylenically unsaturated monomers with a solubility in water of >80 g/l.

Preferably, the monomer mixture used in the polymerization comprises at most 3% by weight, particularly preferably at most 1% by weight, of monoethylenically unsaturated monomers with a solubility in water of <10 g/l.

In an alternative preferred embodiment, the monomer mixture comprises at least 80% by weight, in particular at least 90% by weight, of monoethylenically unsaturated monomers with a solubility in water of ≧50 g/l.

In a specific embodiment, the monomer used is acrylic acid, methacrylic acid or N-vinylimidazole.

The polymers obtained in the polymerization have a solids content of preferably from 10 to 60% by weight, particularly preferably from 15 to 50% by weight, in particular from 20 to 50% by weight, based on the total weight of the polymer solution.

The polymers obtained in the presence of the $C_4$–$C_6$-polymercaptopolyols used according to the invention have a weight-average molecular weight $M_w$ of from preferably 500 to 100 000, particularly preferably from 1000 to 50 000 and in particular from 1500 to 30 000. The K values of the polymers in accordance with Fikentscher (H. F. Fikentscher, Zellulose-Chemie, Volume XIII, 1932, pages 58 to 64) measured as a 1% strength by weight solution of the polymer in water at pH 7) are at least 5, preferably at least 7 and in particular at least 10.

The solution polymerization or the precipitation polymerization is carried out in accordance with customary processes known to a person skilled in the art. Thus, for example, monomer and $C_4$–$C_6$-polymercaptopolyol may be initially introduced into the solvent, heating them to the reaction temperature and starting the polymerization by adding the initiator. Alternatively, the regulator can firstly be initially introduced into the solvent and heated to the reaction temperature and then the monomer and the initiator are added separately. Finally, it is possible to add both regulator and also monomer and initiator in each case separately, the addition taking place all at once, in portions or preferably continuously, to the solvent heated to the polymerization temperature. If an initiator system of two or more components is used, then one component may be initially introduced into the reaction mixture, and the other may be metered in. However, all initiator components may also be metered in together.

The polymerization can also be carried out in the presence of suitable corrosion inhibitors, such as phosphorous acid. This is particularly advantageous when monomers containing acid groups are to be polymerized in reaction vessels made of corrodable material.

The polymerization temperature is essentially dependent on the initiators used, particularly when these are thermally activatable. The polymerization reaction preferably takes place at a temperature of from 70 to 150° C., particularly preferably from 80 to 130° C.

The reaction pressure is of minor importance. The polymerization can therefore take place either at atmospheric pressure or at superatmospheric or subatmospheric pressure. It is preferably carried out with the exclusion of oxygen, in particular in the presence of an inert gas, for example nitrogen.

To achieve the purest possible polymers with a low residual monomer content, the main polymerization may be followed by an afterpolymerization step. The afterpolymerization may take place in the presence of an initiator system which is the same as or different to that for the main polymerization. The afterpolymerization can take place at the same temperature, at a higher temperature or at a lower temperature than the main polymerization. It is also possible, in order to obtain products with particularly high purity after the polymerization, to subject them where appropriate before and/or after an afterpolymerization, to steam distillation or steam stripping. This treatment serves, for example, to remove undesired impurities which can be removed with steam, e.g. residual monomers from the reaction mixture. However, the aftertreatment is not absolutely necessary in order to remove unpleasant odors which originate from sulfur-containing regulators of the prior art. In any case, the duration of the aftertreatment in the case of the use according to the invention of $C_4$–$C_6$-polymercaptopolyols as regulators is significantly lower than in the case of the use of customary thiols.

The polymer solutions from the solution polymerization or the polymer dispersions from the precipitation polymerization can be converted to powder form by various drying methods, such as spray-drying, fluidized spray-drying, roll drying or freeze-drying. The product is preferably subjected to spray-drying. These obtained polymer dry powders can generally be stored better, transported more easily and can be converted into an aqueous solution or dispersion as required by dissolution or redispersion, respectively, in water.

The use according to the invention of $C_4$–$C_6$-polymercaptopolyols in the solution or precipitation polymerization of ethylenically unsaturated compounds allows polymers to be prepared which are odor-neutral even without complex aftertreatment to remove the regulator.

The present invention is illustrated by the examples below.

EXAMPLES

Acrylic acid, methacrylic acid and vinylimidazole were in each case polymerized in the presence of the 1,4-dimercaptobutane-2,3-diol according to the invention or in the presence of noninventive regulators in a solution polymerization, and the properties of the polymers obtained were determined.

1. Polymerization of acrylic acid

Example 1.1

Polymerization of Acrylic Acid in the Presence of 1,4-dimercaptobutane-2,3-diol as Regulator 300 g of distilled water were initially introduced into a reactor fitted with stirrer, nitrogen inlet, reflux condenser and metering device and heated to an internal temperature of 100° C. with the introduction of nitrogen. To this were continuously added, in three separate feeds, 571 g of acrylic acid over the course of 4 hours, a mixture of 5.71 g of sodium persulfate and 57.0 g of distilled water over the course of 4 hours 15 minutes, and a mixture of 34.26 g of 1,4-dimercaptobutane-2,3-diol and 100 g of distilled water over the course of 3 hours 45 minutes. When the initiator feed was complete, the mixture was cooled to 80° C., and a mixture of 0.644 g of 2,2'-azobis(2-methylpropionamidine) hydrochloride and 21 g of distilled water were continuously metered in over the course of 30 minutes. Subsequently, the mixture was stirred for a further hour at 80° C. and then adjusted to a pH of 7.5 using 615 g of 50% strength by weight sodium hydroxide solution, during which the temperature was held at 80° C. This gave a slightly yellowish clear solution with a solids content of 48.7% and a K value (1% strength in water) of 30.3. The weight-average molecular weight $M_w$ was 7700 g/mol.

Comparative Example 1.1

Polymerization of Acrylic Acid in the Presence of Mercaptoethanol as Regulator 525 g of distilled water were initially introduced into a reactor fitted with stirrer, nitrogen inlet, reflux condenser and metering device and heated to an internal temperature of 99° C. with the introduction of nitrogen. To this were added continuously, in three separate feeds, a mixture of 1000.0 g of acrylic acid and 175.0 g of distilled water over the course of 4 hours, a mixture of 10.0 g of sodium persulfate and 100 g of distilled water over the course of 4 hours 30 minutes and 50.0 g of mercaptoethanol over the course of 3 hours 45 minutes. When the initiator feed was complete, the mixture was cooled to 80° C., and a mixture of 1.25 g of 2,2'-azobis (2-methylpropionamidine) hydrochloride and 36.75 g of distilled water was continuously metered in over the course of 30 minutes. Subsequently, the mixture was stirred for a further hour at 80° C. and then adjusted to a pH of 7 using 980.5 g of 50% strength by weight sodium hydroxide solution, during which the temperature was kept at 80° C. This gave a strong-smelling, weak yellowish clear solution with a solids content of 46.7% and a K value (1% strength in water) of 30.1. The weight-average molecular weight $M_w$ was 8400 g/mol.

Comparative Example 1.2

Polymerization of Acrylic Acid in the Presence of Dodecylmercaptan as Regulator 300.0 g of distilled water were initially introduced into a reactor fitted with stirrer, nitrogen inlet, reflux condenser and metering device and heated to an internal temperature of 100° C. with the introduction of nitrogen. To this were continuously added, in three separate feeds, a mixture of 571 g of acrylic acid and 100 g of distilled water over the course of 4 hours, a mixture of 5.71 g of sodium persulfate and 57.0 g of distilled water over the course of 4 hours 15 minutes and 34.3 g of dodecylmercaptan over the course of 3 hours 45 minutes. The reaction mixture became cloudy and very viscous. When the dodecylmercaptan feed was complete, the mixture was diluted with 100 g of distilled water and, when the initiator feed was complete, was cooled to 80° C., diluted over 100 g of distilled water, and a mixture of 0.644 g of 2,2'-azobis(2-methylpropionamidine)hydrochloride and 21 g of distilled water was continuously metered in over the course of 30 minutes. Subsequently, the mixture was stirred for a further hour at 80° C. and then adjusted to a pH of 7.5 using 50% strength by weight sodium hydroxide solution, during which the temperature was maintained at 80° C. This gave a weakly yellowish cloudy, high-viscosity solution with a solids content of 25% and a K value (0.1% strength in water) of 269. The weight-average molecular weight $M_w$ was 790 000 g/mol.

Example 2.1

Polymerization of Methacrylic Acid in the Presence of 1,4-dimercaptobutane-2,3-diol as Regulator 350 g of distilled water were initially introduced into a reactor with stirrer, nitrogen inlet, reflux condenser and metering device and heated to an internal temperature of 90° C. with the introduction of nitrogen. To this mixture were continuously added, in three separate feeds, a mixture of 200 g of methacrylic acid, 55 g of 50% strength by weight sodium hydroxide solution and 350 g of distilled water over the course of 5 hours, a mixture of 2.0 g of sodium persulfate and 100 g of distilled water over the course of 5 hours 15 minutes, and a mixture of 2 g of 1,4-dimercaptobutane-2,3-diol and 100 g of distilled water over the course of 5 hours. When the feeds were complete, the mixture was polymerized for 1 hour 30 minutes at 95° C. This gave a colorless clear solution with a solids content of 18%, a pH of 4.7 and a K value (1% of the neutralized polymer solution in distilled water) of 38. The weight-average molecular weight was 15 000 g/mol.

Comparative Example 2.1

Polymerization of Methacrylic Acid without Regulator 350 g of distilled water were initially introduced into a reactor fitted with stirrer, nitrogen inlet, reflux condenser and metering device and heated to an internal temperature of 90° C. with the introduction of nitrogen. To this were continuously added, in two separate feeds, a mixture of 200 g of methacrylic acid, 55 g of 50% strength by weight sodium hydroxide solution and 350 g of distilled water over the course of 5 hours, and a mixture of 2.0 g of sodium persulfate and 100 g of distilled water over the course of 5 hours 15 minutes. When the feed was complete, the mixture was polymerized for 1 hour 30 minutes at 95° C. This gave a colorless clear solution with a solids content of 21.9%, a pH of 5.0 and a K value (1% of the neutralized polymer solution in distilled water) of 72. The weight-average molecular weight $M_w$ was 80 000 g/mol.

Example 3.1

Polymerization of a Vinylimidazole in the Presence of 1,4-dimercaptobutane-2,3-diol as Regulator 276 g of distilled water were initially introduced into a reactor fitted with stirrer, nitrogen inlet, reflux condenser and metering device and heated to an internal temperature of 80° C. with the introduction of nitrogen. To this were continuously added, in three separate feeds, 200 g of vinylimidazole over the course of 3 hours, a mixture of 4.0 g of 2,2'-azobis(2-methylpropionamidine)hydrochloride and 100 g of distilled water over the course of 3 hours 30 minutes, and a mixture of 4.0 g of 1,4-dimercaptobutane-2,3-diol and 100 g of distilled water over the course of 3 hours. When the feed was complete, the mixture was polymerized for 1 hour at 80° C. Subsequently, a mixture of 1.0 g of 2,2'-azobis(2-methylpropionamidine)hydrochloride and 20 g of distilled water was added over the course of 30 minutes and the mixture was polymerized for 2 hours at 80° C. This gave a brown, clear solution with a solids content of 28.5%, a pH of 8.1 and a K value (1% of the neutralized polymer solution in distilled water) of 26. The weight-average molecular weight $M_w$ was 40 400 g/mol.

Comparative Example 3.1

Polymerization of Vinylimidazole in the Presence of Mercaptoethanol as Regulator 276 g of distilled water were initially introduced into a reactor fitted with stirrer, nitrogen inlet, reflux condenser and metering device and heated to an internal temperature of 80° C. with the introduction of nitrogen. This were continuously added, in three separate feeds, 200 g of vinylimidazole over the course of 3 hours, a mixture of 4.0 g of 2,2'-methylpropionamidine)hydrochloride and 100 g of distilled water over the course of 3 hours 30 minutes, and a mixture of 4.0 g of mercaptoethanol and 100 g of distilled water over the course of 3 hours. When the feed was complete, the mixture was polymerized for 1 hour at 80° C. Subsequently, a mixture of 1.0 g of 2,2'-azobis(2-methylpropionamidine) hydrochloride and 20 g of distilled water was added over the course of 30 minutes, and the mixture was polymerized for 2 hours at 80° C. This gave a strong-smelling, brown, clear solution with a solids content of 29.6%, a pH of 8.2 and a K value (1% of the neutralized polymer solution in distilled water) of 26. The weight-average molecular weight $M_w$ was 41 400 g/mol.

The properties of the polymers obtained in the examples and comparative examples are summarized in the table below:

| Example | Monomer | Odor of the product (olfactory) | K value (1% in $H_2O$) | Molecular weight $M_w$ [g/mol] |
| --- | --- | --- | --- | --- |
| Example 1.1 | Acrylic acid | weak | 30 | 7700 |
| Comparative example 1.1 | Acrylic acid | very strong | 30 | 8400 |
| Comparative example 1.2 | Acrylic acid | very strong | 269* | 790000 |
| Example 2.1 | Methacrylic acid | weak | 38 | 15000 |
| Comparative example 2.1 | Methacrylic acid | weak | 72 | 80000 |
| Example 3.1 | Vinylimidazole | weak | 26 | 40400 |
| Comparative example 3.1 | Vinylimidazole | very strong | 26 | 41400 |

*0.1% in $H_2O$, dilution required because of the high viscosity

We claim:

1. A process for polymerization of ethylenically unsaturated monomers in an aqueous solvent by a free-radically initiated solution or precipitation polymerization technique in the presence of a chain regulator wherein the chain regulator is at least one $C_4$–$C_6$-polymercaptopolyol.

2. The process as claimed in claim 1, where the $C_4$–$C_6$-polymercaptopolyol is 1,4-dimercaptobutane-2,3-diol.

3. The process as claimed in claim 1, where the aqueous solvent is water or a mixture of water and at least one organic solvent which is essentially completely miscible with water.

4. The process as claimed in claim 3, where the water content of the aqueous solvent is at least 50% by weight.

5. The process as claimed in claim 1, where the ethylenically unsaturated monomers comprise
    A) 45 to 100% by weight of monoethylenically unsaturated monomers with a solubility in water of >80 g/l
    B) 0 to 55% by weight of monoethylenically unsaturated monomers with a solubility in water of from 10 to 80 g/l
    C) 0 to 5% by weight of monoethylenically unsaturated monomers with a solubility in water of <10 g/l.

6. The process as claimed in claim 1, where the ethylenically unsaturated monomers comprise at least 80% by weight of monomers with a solubility in water of at least 50 g/l.

7. The process as claimed in claim 1, where the $C_4$–$C_6$-polymercaptopolyol is used in an amount of from 0.01 to 25% by weight, based on the total weight of the monomers.

8. The process as claimed in claim 1, where the polymerization is initiated by an initiator which triggers the free-radical polymerization.

9. The process as claimed in claim 8, where the initiator is chosen from water-soluble peroxides, hydroperoxides and azo compounds.

10. The process as claimed in claim 8, where the amount of initiator is from 0.05 to 15% by weight, based on the total weight of the ethylenically unsaturated monomers.

11. A process for the preparation of polymers by free-radically initiated solution or precipitation polymerization of ethylenically unsaturated monomers in an aqueous solvent in the presence of a regulator, which comprises utilizing a $C_4$–$C_6$-polymercaptopolyol as the regulator.

* * * * *